June 21, 1949.                    H. MURPHY                        2,473,899
              ARTICULATED AND UNIVERSAL JOINT FOR
                   PROPELLERS AND OTHER MECHANISMS
Filed Dec. 11, 1943                                  3 Sheets-Sheet 1

INVENTOR
Howard Murphy
BY
ATTORNEY

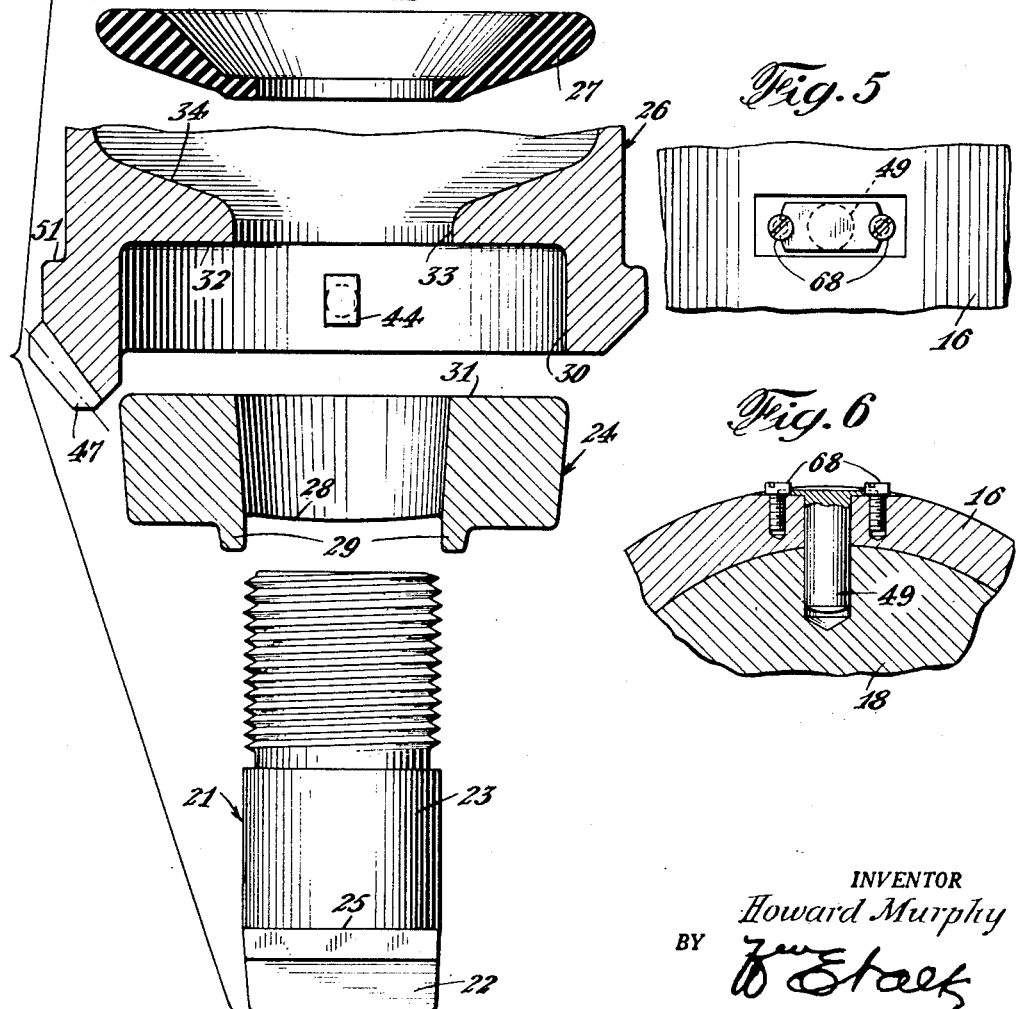

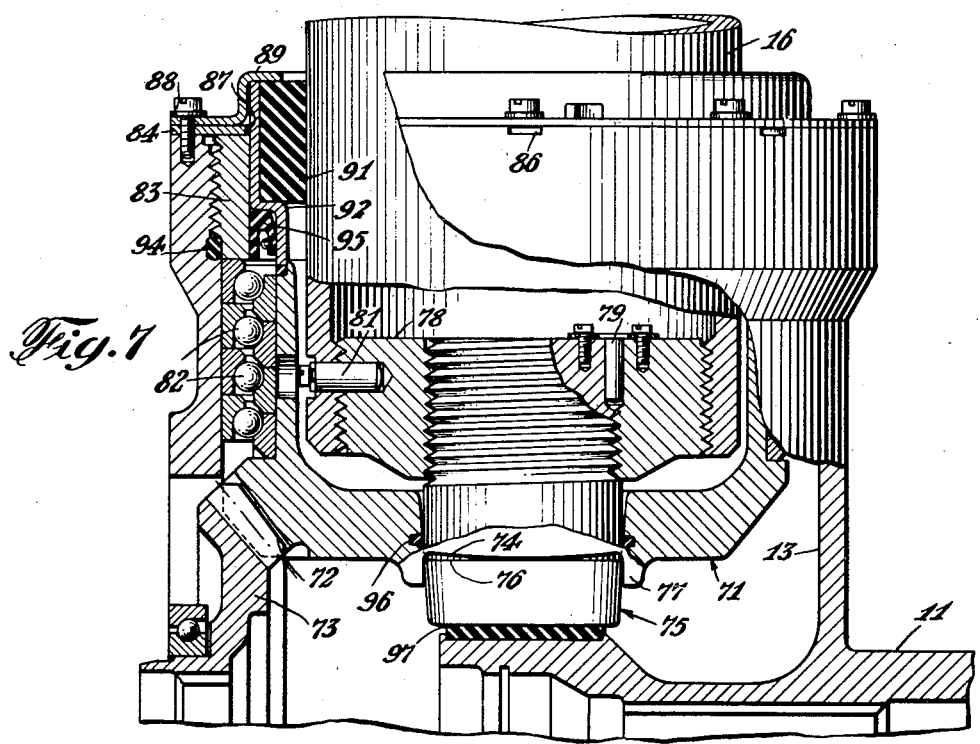
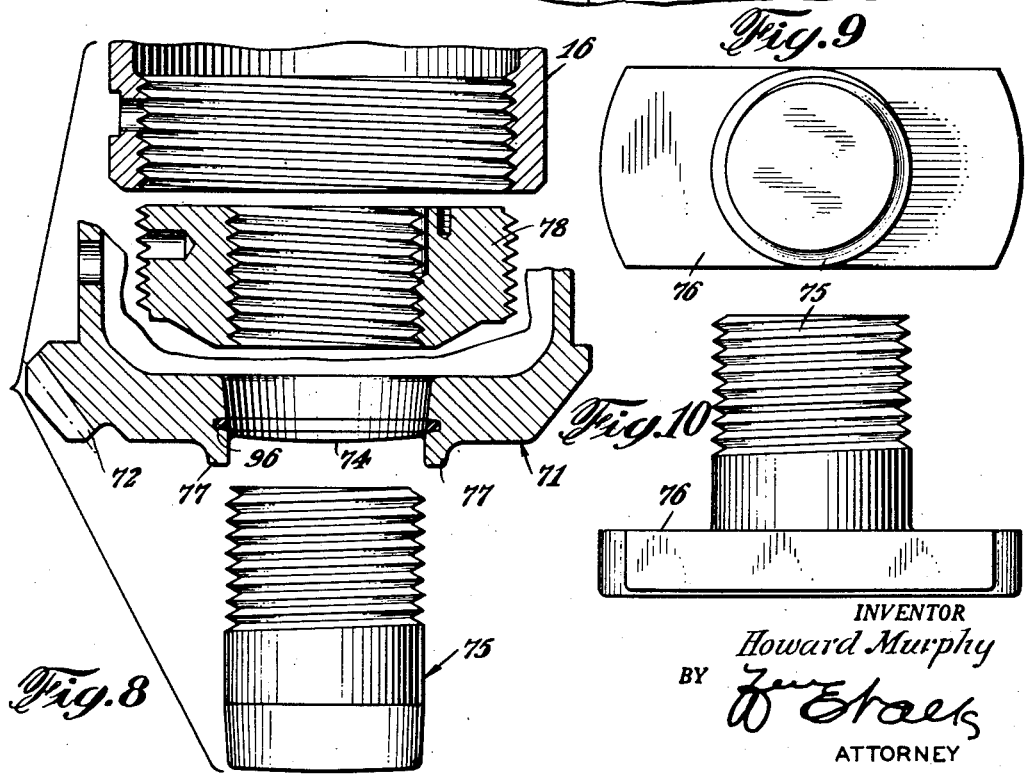

Patented June 21, 1949

2,473,899

UNITED STATES PATENT OFFICE 2,473,899

ARTICULATED AND UNIVERSAL JOINT FOR PROPELLERS AND OTHER MECHANISMS

Howard Murphy, Glen Ridge, N. J., assignor to Curtiss-Wright Corporation, a corporation of Delaware Application December 11, 1943, Serial No. 513,982

12 Claims. (Cl. 170—160.52)

This invention relates primarily to universal and articulated joints or couplings, and especially to devices of this type that are required to sustain unusually heavy longitudinal loads in relation to their size.

Heretofore all such joints and couplings have been so constructed that the component parts thereof are arranged to slide relatively to each other. This is true whether the component parts are hinged or are formed into any type of cylindrical, conical, spherical or other description of bearing. In such constructions the sliding contacting surfaces frequently seize, or become abraded or excoriated under the action of heavy loads, which results in failure of the joint or coupling.

Attempts have been made to overcome this objectionable action by the use of ball, roller and other types of anti-friction elements interposed between the relatively sliding surfaces of the joint. While such arrangements function satisfactorily under light loads in the case of cylindrical and conical bearings, they are not practical in the case of spherical bearings. Under all circumstances, however, these types of anti-friction bearings require considerable space, and consequently it is rarely feasible to use the large sizes that are required for heavy loads.

With the above in mind, the principal object of this invention is to provide an articulated or universal joint which does not include any of the undesirable features enumerated and which is particularly adapted to sustain heavy longitudinal loads without undue wear or other deleterious action.

A further object is to provide a joint of the above type which requires exceptionally small space in relation to the magnitude of the sustained load it is capable of carrying.

A still further object is to provide constructions which are simple, rugged, reliable and compact and which can be manufactured at low cost by ordinary machining processes.

A still further object is to accomplish these ends without any sliding action between the pressure surfaces of the joints which sustain longitudinal loads.

A still further object is to provide joints of the character described wherein the longitudinal loads are sustained entirely, or substantially so, by component members adapted to roll one on the other without any relative sliding movement therebetween.

A still further object is to provide joints of the above description which are adapted to transmit torque loads, without appreciable lost motion, simultaneously with heavy longitudinal loads.

A still further object is to provide means for preloading joints constructed along these lines, so as to prevent undue longitudinal movement when the load to be supported is applied.

The above and other objects and novel features of the invention will appear more fully hereinafter from the following detailed description when taken in connection with the accompanying drawings, wherein two embodiments of the present invention are illustrated. It is to be expressly understood, however, that the drawings are for purposes of illustration only and are not designed as a definition of the limits of the invention, reference being had for this purpose to the appended claims.

Obviously, universal and articulated joints of the character mentioned are adapted for use in a wide field of mechanical equipment, devices and appliances, and it is, therefore, the purpose of this invention to provide constructions which may be utilized in any industry or in any description of mechanism where movable joints are or can be advantageously employed.

The accompanying drawings show only one of the many uses and applications for such joints, namely, one in the airplane propeller industry, where the problem of securing rotatable blades to the hub of a variable pitch propeller is always a difficult one, and is especially so if provision be made for permitting each blade to swing in its socket as well as to pivot or turn therein about its longitudinal axis. The pivotal motion is necessary for the alteration of blade pitch, and the swinging motion, which may be either hinge-like or universal, is desirable in order to reduce or eliminate bending stresses in the blade shank.

It is particularly desirable to provide for this swinging motion in the case of the larger and heavier sizes of blades because of the severe bending stresses that are otherwise developed in their shanks. Heretofore, however, no practical solution of the problem has been found, due to the fact that excessively high centrifugal forces act on such blades during rotation of the propeller on which they are mounted. This will be readily comprehended when it is realized that these forces range up to 200,000 pounds per blade and may at times run even higher.

To those familiar with the propeller art it is obvious that space and weight limitations preclude the possibility of successfully using any type of articulated or universal joint to support such forces, if there is any sliding action between the supporting surfaces, whether such surfaces are in direct contact or have any usable sizes of ball or roller bearings interposed between them. On the other hand, it is equally obvious that the direct rolling action between the supporting surfaces, which is provided for by the present invention, insures a compact, practical, high-capacity joint that meets the most extreme service demands.

Referring to the drawings wherein similar reference characters refer to similar parts throughout the several views:

Fig. 3 is an exploded view of the principal elements included in the propeller blade mounting or anchoring arrangement of Figs. 1 and 2;

Figure 1:
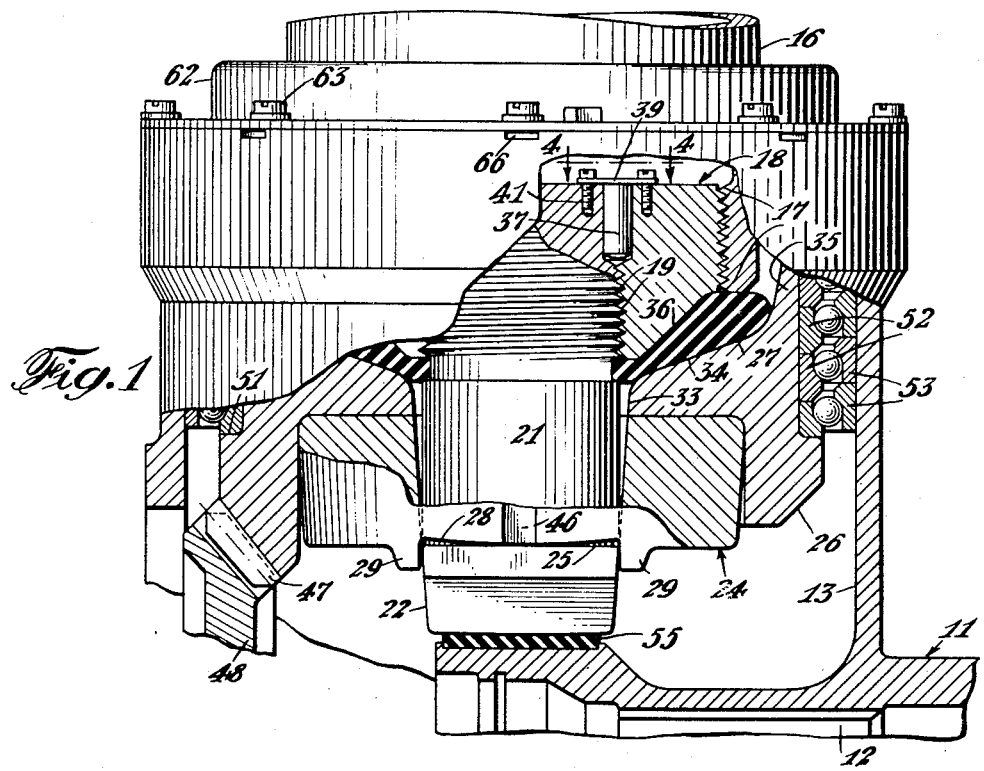
Fig. 1 is a view partly in section of a universal propeller blade mounting and hub socket constructed in accordance with the present invention, with the section plane taken substantially parallel to the axis of the propeller shaft.
Figure 2:
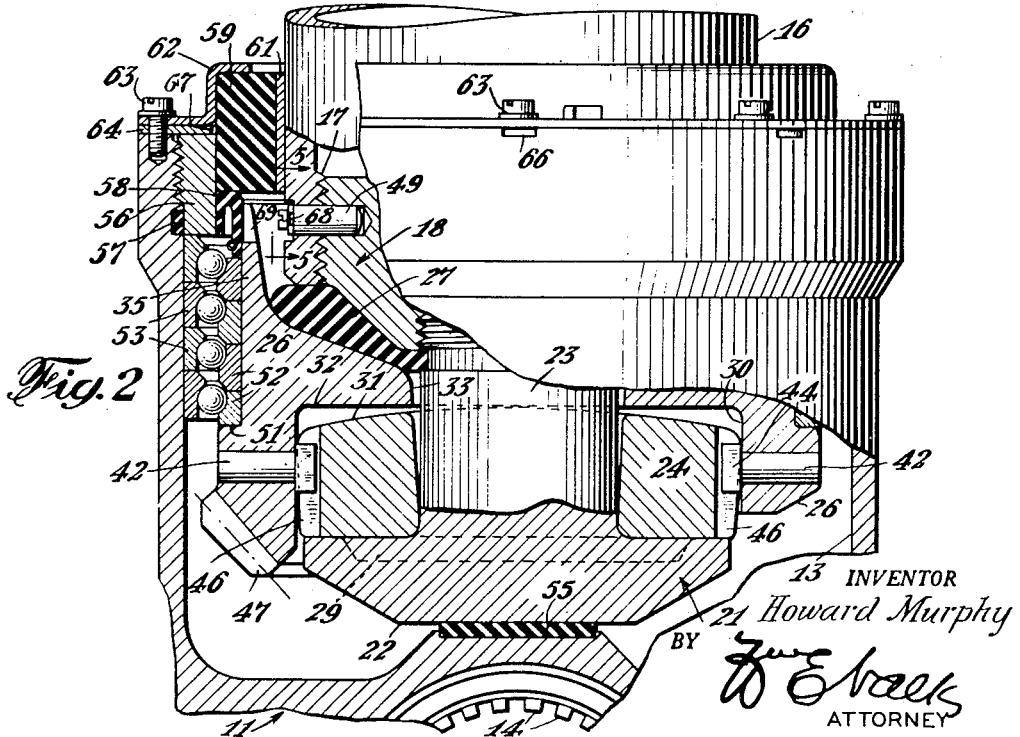
Fig. 2 is a view partly in section of the elements of the blade mounting and socket of Fig. 1, with the section plane taken substantially perpendicular to the axis of the propeller shaft.

Figs. 4 and 5 are detail views of two locking keys or pins taken substantially on lines 4—4 and 5—5 of Figs. 1 and 2, respectively;

Fig. 6 is a sectional view of the detail of Fig. 5 taken on line 6—6 thereof;

Fig. 7 is a view somewhat similar to Fig. 1 showing a propeller blade mounted in accordance with a modification of the invention;

Fig. 8 is an exploded view of the principal elements of Fig. 7; and

Figs. 9 and 10 are top and side views, respectively, of one of the blade mounting or anchoring units of Fig. 7.

Referring first to Figs. 1 and 2, there is shown, by way of general illustration, one of the blade sockets of a multiple socket propeller hub with a propeller blade rotatably mounted and swingingly anchored therein. The propeller hub is indicated generally by the reference numeral 11 and has a central bore 12 adapted to receive a propeller shaft and a plurality of substantially radially extending blade sockets such as 13. Only one of the blade sockets 13 is shown in the drawings, the other sockets being identical to the one shown. The central bore 12 of the propeller hub 11 may have splines such as 14, Fig. 2, adapted to cooperate with similar splines on the propeller shaft so as to form effective driving engagement therewith.

The blade socket 13, Figs. 1 and 2, is open at its upper end to receive the blade shank 16 which is anchored therein in a manner about to be described. For the purpose of illustrating the principles of the invention, a hollow shank blade, such as that of an aeronautical propeller, is shown anchored in the blade socket 13. It will be obvious, however, that the principles of the invention are not limited in application to this or any other particular type of blade, nor to the propeller art, but may be applied to any description of mechanism wherein articulated or universal joints are required to carry longitudinal loads, and especially relatively heavy longitudinal loads, with or without torque loads.

The blade shank 16 is cylindrical, as is the blade socket 13, and has internal threads 17 at the lower end thereof. A threaded adapter or reducer 18 is threaded into the blade shank 16 and has internal threads 19 arranged to receive the threaded end of a combined thrust and torsion member, indicated generally by reference numeral 21, which for the specific construction under consideration may be conveniently formed in the shape of a T-bolt as shown, but which for other purposes may be made in any shape adapted to the transmission of thrust loads alone or thrust and torsion loads combined. A full section of the adapter 18 is shown in the exploded view, Fig. 3, together with a side view of the T-bolt 21 and cooperating elements.

The T-bolt 21 has a head 22 and a shank section 23 which passes through the center of a ring 24, a blade or pitch changing gear 26, and a ring 27 of compressible or pliant material such as rubber, all of which are located between the head 22 and the adapter 18. The inside surface 25 of the head of the T-bolt 21 is substantially flat and engages a substantially cylindrical surface 28, Figs. 1 and 3, on the underside of the ring 24, thus providing for rolling motion of one of these surfaces on the other. The cylindrical surface 28 is diametrically across the bottom of the ring 24 and is preferably of long radius, in the neighborhood of eight to twelve inches or more; the length of the radius depending in part upon the degree of swinging motion to be provided for the blade and in part upon the extent of off-center movement which is permissible as a result of the rolling motion mentioned above. It is obvious that as the length of the radius is increased, the effective bearing area and capacity of the joint are also increased, and, therefore, it is desirable to use as great a length as is consistent with practical limitations. The hole through the center of the ring 24 is tapered slightly, being of greater diameter at the top than at the bottom where it is properly proportioned to adequately centralize the T-bolt 21 and at the same time permit it to swing without sliding when rolling on the contact surface 28. To prevent rotation of the ring 24 relatively to the T-bolt 21, a pair of flanges 29 are provided on the underside of the ring which cooperate for this purpose with opposite sides of the T-bolt head 22, as clearly shown in Figs. 1, 2, and 3.

The ring 24, which is slightly tapered on its outside diametral surface, fits into a counterbore 30 in the underside of the blade gear 26. The upper surface 31 of the ring 24 is cylindrical, with the axis of this cylindrical surface, as shown in Figs. 1 and 2, substantially at right angles to the axis of the cylindrical surface 28 on the lower side thereof. The radius of the cylindrical surface 31 on the upper side of the ring 24 may be substantially the same as the radius of the cylindrical surface 28 on the underside thereof, though no definite relationship between them is required. The cylindrical surface 31 of ring 24 cooperates with a substantially flat surface 32 at the end of the counterbore 30 in the blade gear 26, thus providing for rolling motion of one of these surfaces on the other. The fit of the ring 24 in the counterbore 30 is sufficiently close to adequately centralize one with the other, but enough clearance is provided between the counterbore and the ring to permit of free rolling movement of the surface 31 on the surface 32 without any sliding therebetween; the taper on the outside diametral surface of the ring 24 cooperating to prevent interference with such rolling movement.

The depth of the counterbore in the blade gear 26 is immaterial except to suit space requirements. The center hole 33 through the blade gear is slightly tapered and is slightly larger than the shank portion 23 of the T-bolt 21, so as to permit the latter to swing to the limit provided by the central bore in ring 24. The surface 34 of the blade gear, extending from the center hole 33 to the side walls or skirt portion 35 thereof, slopes downwardly towards the center hole, as shown in Figs. 1 and 2, and bears against the lower surface of the resilient ring 27. The upper surface of the resilient ring 27 bears against the extreme end of the blade shank 16 and also against the sloping surface 36 on the lower end of the adapter 18. The surface 36 of the adapter 18 is sloped at a greater angle than the surface 34 of the blade gear, and the resilient ring 27 engaging these surfaces is, therefore, thicker at the edges than at the center.

In assembling the above-described units, the ring 24, the blade gear 26, the resilient ring 27, in the order named, are placed on the shank 23 of the T-bolt 21, and the adapter 18 is then threaded onto the threaded portion thereof. The adapter 18 is tightened on the T-bolt 21 until the resilient ring is slightly compressed, after which a locking pin such as 37, Fig. 1, may be inserted in a hole formed between the cooperating threads of the adapter 18 and the T-bolt. The pin 37 has a flat head 39 which is anchored by screws such as 41 to the adapter 18 and the upper end of the T-bolt.

Prior to the placing of the blade gear 26 on the T-bolt carrying the ring 24, a pair of diametrically opposite feather keys 42 are inserted in radial holes in the walls of the counterbore 30 of the blade gear with the heads 44 of the keys extending into the counterbore. The heads 44 are flat-sided and cooperate with axial grooves 46 in opposite sides of the ring 24. The keys 42 thus keep the ring 24 from rotating relatively to the blade gear 26 about the central axis thereof, while at the same time permitting the cylindrical surface 31 of the ring to roll on the flat surface 32 forming the end of the counterbore in the blade gear. This rolling motion of the ring 24 on the gear 26 is in the plane of the elements as shown in section in Fig. 2, which is perpendicular to the plane in which the T-bolt is permitted to roll on ring 24, as previously described, which is in the plane of the elements as shown in Fig. 1. Obviously, these planes will always remain in the same relative position to each other regardless of the rotation of gear 26 about its central axis. Accordingly, the T-bolt 21 through a combination of the two described rolling movements in intersecting planes is free to swing in any direction relatively to the blade gear 26, the axis of which is substantially radial to the axis of the central hub bore 12, and such swinging is effected solely through direct rolling contacts between the described cooperating surfaces.

The blade gear 26, which is the power actuated element by which the pitch of the propeller blade is changed, has a toothed segment 47 engaging the teeth of a gear 48, Fig. 1. The gear 48 is mounted concentrically with the propeller shaft or the axis of the bore 12 of the propeller hub 11 and may be rotated relatively to the propeller shaft or hub by any of the well-known propeller blade pitch changing mechanisms in order to alter the pitch of the blade 16. The toothed segement 47 of the blade gear is of sufficient extent to provide the maximum amount of desired pitch changing movement of the blade, and since each blade mounted in the hub 11 will have a blade gear segment such as 47 engaging the gear 48 the pitch of all the blades will change equally and simultaneously. It will be noted that rotative movement of the gear 48 is transmitted without lost motion through the blade gear 26, the ring 24, the T-bolt 21 and the adapter 18 to the blade shank 16; the blade shank 16 being coupled to the adapter 18 to rotate therewith by means of the inter-engaging threads and a locking pin 49, Fig. 2, or other convenient means. Thus, the described universal blade anchoring arrangement in no manner whatsoever interferes with the accuracy of operation of the blade pitch changing mechanism.

The blade gear 26 may be mounted in the propeller hub socket 13 by any of the well-known arrangements. In the arrangement illustrated, the blade gear has a flange or circular shoulder 51 thereon which engages the lowermost of the inner races 52 of a stack of ball thrust bearings, the outer races of which are supported by the hub 11 through the medium of a nut 56 threaded into the blade socket 13. The bore of the socket 13 is substantially radial to the central hub bore 12. The thrust bearing 52—53 is thus adapted to permit rotation of the blade gear 26 about a substantially radial axis and to retain it against the action of centrifugal and other forces which are exerted upon it during rotation of the propeller.

When assembling the blade 16 to the hub 11, it is evident that as the nut 56 is tightened, the thrust force developed thereby is transmitted through the thrust bearing 52—53 to the blade gear 26. This force on the blade gear is transmitted through the ring 24 to the T-bolt 21, the head of which may bear against a piece of resilient material 55 of suitable characteristics supported by the portion of the hub 11 surrounding the propeller shaft bore 12. By this means, the thrust bearing and the rolling contact surfaces of the parts 21, 24 and 26 may be preloaded.

A packing ring 57 substantially rectangular in cross-section may engage the lower outside surface of the nut 56, while another packing ring 58 having a U-shaped cross-section may engage the lower inside surface of the nut 56 and the outer surface of the upper end 35 of the blade gear 26. The packing rings 57 and 58 are for the purpose of preventing the escape of lubricant carried in the blade socket, and the ring 27 may cooperate with the packing rings 57 and 58 in this respect. Located above the packing ring 58 and engaged on its lower side thereby is a buffer ring 59 of pliant material such as rubber which has secured to the inner surface thereof, as by means of a vulcanizing process, a metal sleeve 61 which fits slidably about the lower end of the blade shank 16. The ring 61 permits rotation of the blade 16 about its longitudinal axis without chafing or scuffing of the rubber buffer ring 59. The buffer ring 59 yieldably supports the blade against transverse movement, thus tending to hold the longitudinal axis of the same coincident with the axis of the hub socket 13. During acceleration of the propeller and while the forces acting thereupon are changing and thus causing the blade to swing from one position of equilibrium to another, the buffer ring 59 will act to prevent any clashing or objectionable impact which might otherwise occur between relatively moving parts connected with the blade and the hub.

The buffer ring 59 is held in the blade socket by an offset clamping ring 62 which in turn is secured to the upper end of the blade socket by screws such as 63. The screws 63 may also hold in position one or more keys such as 64 located in radial slots such as 66 and 67 in the upper surfaces of the socket 13 and the nut 56, respectively. The keys 64 prevent movement of the nut 56 relatively to the socket 13.

When mounting a blade in a socket such as 13, the clamping ring 62, the buffer ring assembly 59—61, the packing ring 58, and the nut 56 are slipped over the blade shank 16, following which the sub-assembly consisting of the adapter 18, the ring 27, the blade gear 26 with the thrust bearing 52—53 thereon, the ring 24, and the T-bolt 21 are attached to the blade shank 16 by means of the internal threads 17 thereof engaging the external threads of the adapter 18. The adapter 18 is locked to the blade shank 16 by the pin 49, which passes through the lower wall of the blade shank into the adapter. The pin 49, as shown in Figs. 2, 5 and 6, is held in place by screws such as 68 and an opening such as notch 69 is provided in the upper end 35 of the blade gear to permit the insertion of the pin 49. The blade shank 16 with the associated elements secured thereto is next placed in the socket 13, following which the nut 56 is threaded into the socket and tightened to the desired extent. Next the clamping ring 62 is secured firmly against the buffer ring 59 by screws 63 inserted in the upper end of the socket 13.

In accordance with the above, it is obvious that a propeller blade mounting arrangement is provided which permits free universal swinging of the blade relatively to the propeller hub within predetermined limits, and that such swinging movement is accomplished without any sliding solely through the medium of two free rolling motions, in relatively fixed intersecting planes, which may be at 90 degrees or other suitable angle to each other. It is equally obvious that there is nothing in the arrangement shown which in any way limits its application to propeller mechanisms. On the contrary, as previously emphasized herein, the universal joint construction covered by the present invention is applicable in any art or industry where relatively heavy longitudinal loads are required to be transmitted through universal joints, and also where torque loads may be required to be simultaneously transmitted. A propeller blade mounting has, therefore, simply been used to illustrate the principles and general method of construction included in the invention.

A propeller blade mounting of this type is particularly advantageous, because it permits the blade to freely adjust itself with relation to the axis of its socket, without danger of abrading any contact surfaces, and in this way automatically effect a balance between the opposing moments exerted on it, by aerodynamic and centrifugal forces, thus eliminating or greatly reducing the bending stresses exerted on its shank.

A modification of the above described blade mounting is shown in Figs. 7 to 10, where there is illustrated an articulated joint which provides for swinging motion of a propeller blade through rolling movement in a single plane. This arrangement is desirable because of its simplicity, but it is not as effective in reducing blade shank stresses as a universal type of mounting. In the modification, the propeller hub and blade shank are in all substantial respects similar to those in the preferred embodiment and are accordingly referred to by similar reference numerals. The blade gear 71, Figs. 7 and 8, has a segment with teeth 72 thereon engaging the gear 73 operated by the pitch changing mechanism in the usual manner. The blade gear 71 has a tapered center hole therethrough and a cylindrical surface 74 formed across the lower side thereof. The shank of a T-bolt 75 extends through the center hole of the blade gear with the flat surface 76 on the inside of the head thereof engaging the cylindrical surface 74 on the blade gear. Depending flanges such as 77 on the blade gear engage opposite sides of the head of the T-bolt 75 to prevent the same from rotating relatively to the blade gear about the central axis thereof. The threaded upper end of the T-bolt is engaged by the internal threads of an externally and internally threaded adapter 78, and the two units are locked together by means of a locking pin 79. The external threads of the adapter 78 engage internal threads at the lower end of the shank 16 of the blade, and the blade is prevented from moving relatively to the adapter by a locking pin 81.

The blade gear 71 is supported in the blade socket in the usual manner by a substantially radial thrust bearing such as 82; the thrust bearing in turn being held in the hub socket 13 by a nut 83 having threaded engagement therewith. The nut 83 may be locked in place by one or more keys such as 84 extending across radial grooves such as 86 and 87 in the upper surface of the socket and the nut. The keys 84 may be held in place by screws such as 88, which also secure a ring 89 to the top of the blade socket that retains a resilient buffer ring 91 of rubber or similar material. The buffer ring 91 is supported by a sleeve 92 which is secured to and adapted to rotate with the upper tubular portion of the blade gear 71, so that when the blade pitch is altered there is no chafing action between the buffer ring and blade shank.

The blade socket may also be provided with the usual packing rings 94 and 95 which prevent the leakage of lubricant at the upper end of the socket, and a third packing ring 96 placed in a groove in the blade gear 71 will engage the shank of the T-bolt 75 to prevent leakage of lubricant at that point. As in the preferred embodiment the hub may be provided with resilient material such as 97 engaging the head of the T-bolt 75 whereby the thrust bearing and rolling contact surfaces 74 and 76 may be preloaded.

With elements of the blade mounting in the position shown in Fig. 7, it is obvious that the blade may swing in the plane of the section, and that this plane is fixed relatively to the gear 71. Consequently, the blade is always free to swing in this plane, the position of which is never changed with respect to the gear 71 but is altered with respect to the hub as the gear 71 is rotated to effect pitch changes of the blade. It is also obvious that the swinging motion of the blade is accomplished solely through the rolling of the surface 76 of the T-bolt 75 on the surface 74 of the gear 71, and that at no time is there any sliding between these surfaces which coact to retain the blade against the centrifugal force exerted on it during rotation of the propeller. Furthermore, any turning or torque force exerted by the gear 73 on the gear 71 is transmitted without lost motion to the blade shank 16 through the medium of the T-bolt 75 and the adapter 78, because all of these members are secured against relative rotation about the central axis of the hub socket 13 in the manner previously described herein.

It will be obvious to those skilled in the art that various other modifications of the invention besides those shown and described herein may be made without departing from the spirit or essential attributes thereof, and it is desired, therefore, that only such limitations be placed thereon as are imposed by the prior art or are specifically set forth in the appended claims.

What is claimed as new and desired to be secured by Letters Patent, is:

1. In a variable pitch propeller, a hub, a blade, blade retaining means comprising a substantially radial thrust bearing secured to said hub, a first member rotatably carried by said bearing, a second member disposed at least in part radially inward of said first member supported by and engaging said first member, said members having relatively convex abutments in rolling engagement with one another to sustain radially exerted forces due to said blade, and means passing freely through said first member, at least in part, connecting said blade and said second member.

2. In a variable pitch propeller comprising a hub and a blade, blade retaining means in said hub comprising a substantially radial thrust bearing, a first member supported thereby having an abutment, a second member having two abutments one engaging said first member abutment, a third member having an abutment engaging the second abutment of said second member, said engaged abutments being relatively cylindrically convex and being in rolling engagement with their neighbors, and means securing said blade to said third member, said relatively convex pairs of abutments respectively being constructed for rolling engagement each in a single plane, said planes being substantially at right angles to one another.

3. In a variable pitch propeller comprising a hub and a blade, blade retaining means in said hub comprising a substantially radial thrust bearing, a first member supported thereby having an abutment, a second member having two abutments one engaging said first member abutment, a third member having an abutment engaging the second abutment of said second member, said engaged abutments being relatively cylindrically convex and being in rolling engagement with their neighbors, means securing said blade to said third member, said relatively convex pairs of abutments respectively being constructed for rolling engagement each in a single plane, said planes being substantially at right angles to one another, and means to constrain said members and blade for unitary rotation relative to said hub substantially about the blade axis.

4. In a variable pitch propeller comprising a hub and a blade, blade retaining means in said hub comprising a substantially radial thrust bearing, a first member supported thereby having an abutment, a second member having two abutments one engaging said first member abutment, a third member having an abutment engaging the second abutment of said second member, said engaged abutments being relatively cylindrically convex and being in rolling engagement with their neighbors, means securing said blade to said third member, said relatively convex pairs of abutments respectively being constructed for rolling engagement each in a single plane, said planes being substantially at right angles to one another, means to constrain said members and blade for unitary rotation relative to said hub substantially about the blade axis, and gear means engaging the bearing supported member for rotating said members and blades unitarily substantially about the blade axis to alter blade pitch.

5. In a variable pitch propeller comprising a hub and a blade, blade retaining means in said hub comprising a substantially radial thrust bearing, a first member supported thereby having an abutment, a second member having two abutments one engaging said first member abutment, a third member having an abutment engaging the second abutment of said second member, said engaged abutments being relatively cylindrically convex and being in rolling engagement with their neighbors, means securing said blade to said third member, said relatively convex pairs of abutments respectively being constructed for rolling engagement each in a single plane, said planes being substantially at right angles to one another, and resilient means engaging said blade and first member for urging said blade to a substantially radial position relative to the hub axis to resist articulating movement of said blade on said relatively convex abutments.

6. In a variable pitch propeller comprising a hub and a blade, blade retaining means in said hub comprising a substantially radial thrust bearing, a first member supported thereby having an abutment, a second member having two abutments one engaging said first member abutment, a third member having an abutment engaging the second abutment of said second member, said engaged abutments being relatively cylindrically convex and being in rolling engagement with their neighbors, means securing said blade to said third member, said relatively convex pairs of abutments respectively being constructed for rolling engagement each in a single plane, said planes being substantially at right angles to one another, and means for preloading said abutments into firm engagement with one another.

7. In an articulated mounting for a blade on a variable pitch propeller hub having a blade socket, a retention member secured within and rotatable relative to the socket, said member having an opening substantially coaxial with the socket and an inwardly facing abutment, a thrust member having an outwardly facing abutment engaging the member abutment, said abutments being relatively convex and rollable without sliding on one another about an axis substantially normal to the blade axis, and means freely passing through said retention member opening and securing said thrust member and said blade.

8. In an articulated mounting for a blade on a variable pitch propeller hub having a blade socket, a retention member secured within and rotatable relative to the socket, said member having an opening substantially coaxial with the socket and an inwardly facing abutment, a thrust member having an outwardly facing abutment engaging the member abutment, said abutments being relatively convex and rollable without sliding on one another about an axis substantially normal to the blade axis, means freely passing through said retention member opening and securing said thrust member to said blade, and means to constrain said blade and retention member against relative rotation about the blade and socket axis.

9. In an articulated mounting for a blade on a variable pitch propeller hub having a blade socket, a retention member secured within and rotatable relative to the socket, said member having an opening substantially coaxial with the socket and an inwardly facing abutment, a thrust member having an outwardly facing abutment engaging the member abutment, said abutments being relatively convex and rollable without sliding on one another about an axis substantially normal to the blade axis, means freely passing through said retention member opening and securing said thrust member to said blade, and resilient means engaging said blade and said retention member to urge said blade toward a radial position relative to said socket.

10. In an articulated mounting for a blade on a variable pitch propeller hub having means for mounting a blade for pitch change, a first member rotatable relative to said means having an inwardly facing abutment, a second member inwardly disposed relative to said first member having an abutment engaging said first member abutment, said abutments being relatively convex and said members being rollable on one another through a limited angular range about an axis substantially normal to said blade axis, said second member having an inwardly facing abutment, a third member inwardly disposed relative to said first and second members having an abutment engaging the inwardly facing abutment of the second member, said second and third member engaging abutments being relatively convex and said members being rollable on one another through a limited angular range about an axis substantially normal to the blade axis and substantially normal to the first rolling axis, and means securing said third member to said blade.

11. In an articulated mounting for a blade on a variable pitch propeller hub having means for mounting a blade for pitch change, a first member rotatable relative to said means having an inwardly facing abutment, a second member inwardly disposed relative to said first member having an abutment engaging said first member abutment, said abutments being relatively convex and said members being rollable on one another through a limited angular range about an axis substantially normal to said blade axis, said second member having an inwardly facing abutment, a third member inwardly disposed relative to said first and second members having an abutment engaging the inwardly facing abutment of the second member, said second and third member engaging abutments being relatively convex and said members being rollable on one another through a limited angular range about an axis substantially normal to the blade axis and substantially normal to the first rolling axis, means securing said third member to said blade, and means to constrain said three members and blade to unitary rotation with one another relative to said blade mounting means.

12. In an articulated mounting for a blade on a variable pitch propeller hub having means for mounting a blade for pitch change, a first member rotatable relative to said means having inwardly facing abutments spaced from one another in a direction normal to the blade axis, a second member inwardly disposed relative to said first member having spaced abutments respectively engaging said spaced inwardly facing abutments, the engaged abutments being relatively convex and said members being rollable on one another through a limited angular range about an axis substantially normal to said blade axis, said second member having inwardly facing abutments spaced from one another in a direction substantially normal to the blade axis, a third member inwardly disposed relative to said first and second members having spaced abutments respectively engaging the spaced inwardly facing abutments of said second member, said second and third member engaging abutments being relatively convex and said members being rollable on one another through a limited angular range about an axis substantially normal to the blade axis and substantially normal to the first rolling axis, and means passing between the several sets of spaced abutments securing said third member to said blade.

HOWARD MURPHY.

REFERENCES CITED

The following references are of record in the file of this patent:

UNITED STATES PATENTS

| Number | Name | Date |
|---|---|---|
| 1,298,680 | Dunham | Apr. 1, 1919 |
| 1,579,967 | Sweney | Apr. 6, 1926 |
| 1,607,362 | Powers | Nov. 16, 1926 |
| 1,634,199 | Kuehn | June 28, 1927 |
| 1,802,648 | Heath | Apr. 28, 1931 |
| 1,921,931 | Levasseur | Aug. 8, 1933 |
| 1,927,592 | Lambert | Sept. 19, 1933 |
| 2,040,351 | Williams | May 12, 1936 |
| 2,148,144 | Wallgren | Feb. 21, 1939 |
| 2,156,102 | Austin | Apr. 25, 1939 |
| 2,241,055 | Chilton | May 6, 1941 |
| 2,245,251 | Chilton | June 10, 1941 |
| 2,275,053 | Reissner | Mar. 3, 1942 |

FOREIGN PATENTS

| Number | Country | Date |
|---|---|---|
| 147,096 | Great Britain | Apr. 14, 1921 |